N. GIUSTO.
PLOW.
APPLICATION FILED APR. 11, 1908.
911,229.
Patented Feb. 2, 1909.
2 SHEETS—SHEET 1.
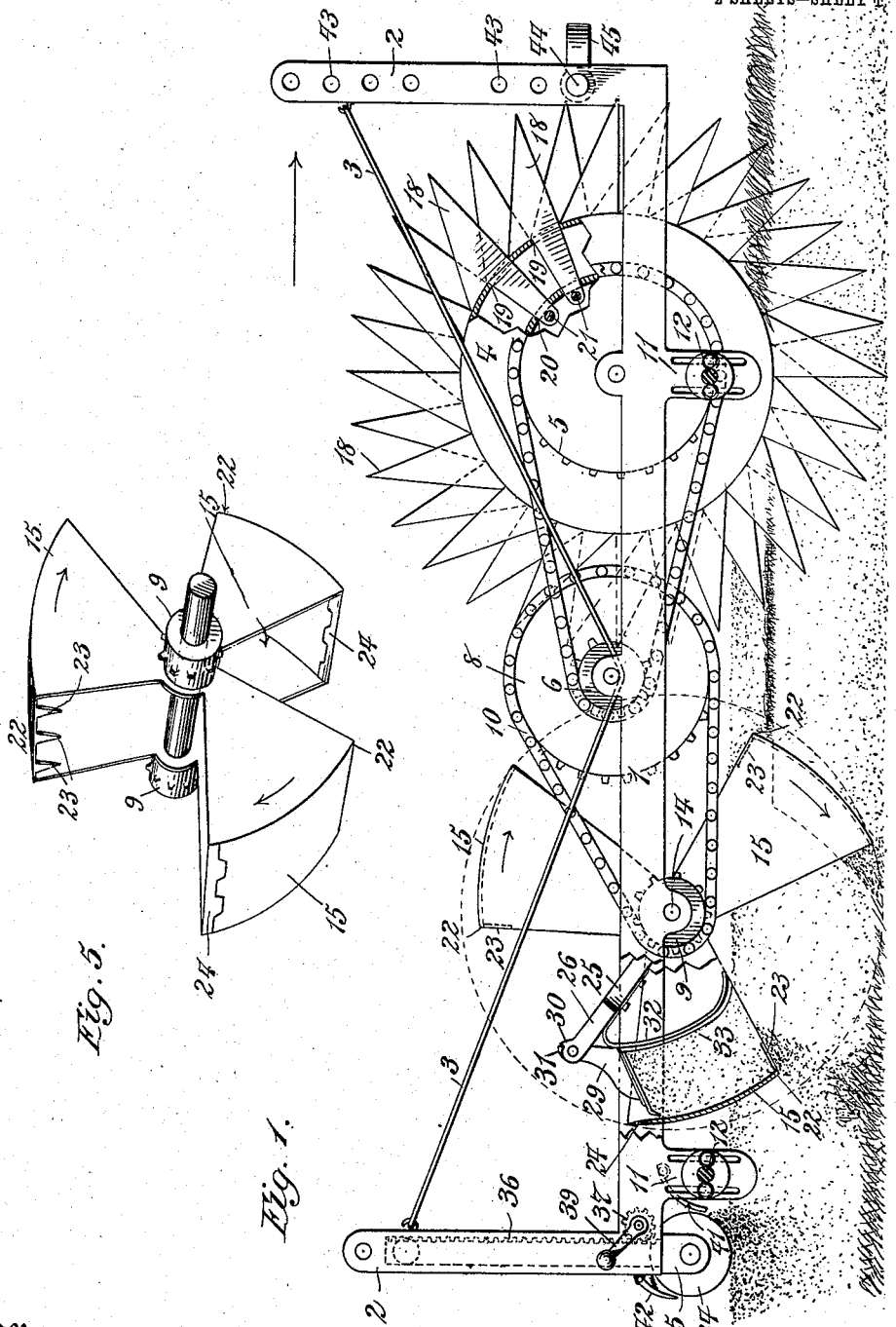

N. GIUSTO.
PLOW.
APPLICATION FILED APR. 11, 1908.
911,229.
Patented Feb. 2, 1909.
2 SHEETS—SHEET 2.
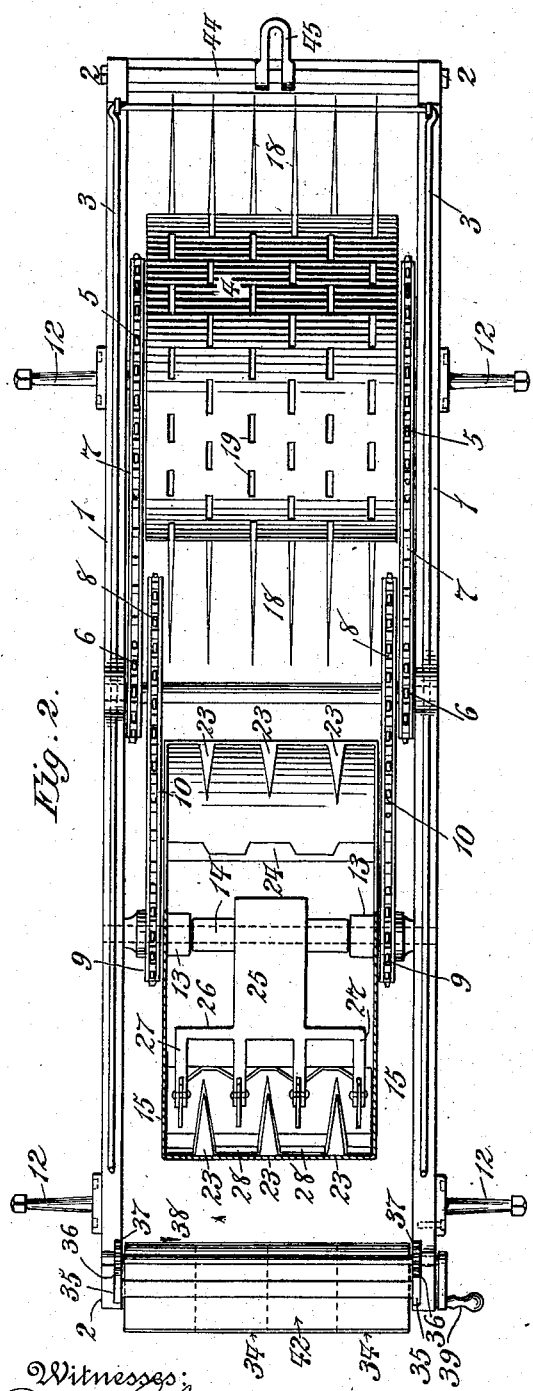
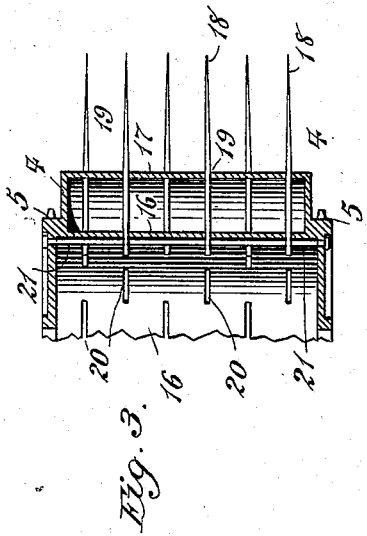
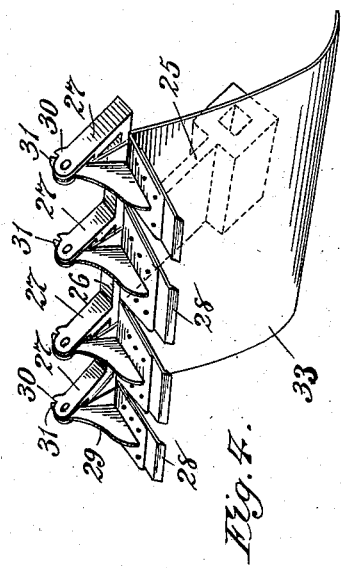
Witnesses:
Edward C. Rowland
M. F. Keating
Inventor
Nicola Giusto
By Attorney
Charles J. Kintner

UNITED STATES PATENT OFFICE.

NICOLA GIUSTO, OF NEW YORK, N. Y.

PLOW.

No. 911,229.　　　Specification of Letters Patent.　　　Patented Feb. 2, 1909.

Application filed April 11, 1908. Serial No. 426,422.

*To all whom it may concern:*

Be it known that I, NICOLA GIUSTO, a subject of the King of Italy, and resident of New York, borough of Brooklyn, county of Kings, and State of New York, have made a new and useful Invention in Plows, of which the following is a specification.

My invention is directed particularly to improvements in that type of plow in which the soil is acted upon by a series of power impelled rotary spades or shovels, and it is designed to operate in such manner that the soil is broken up or pulverized at a single operation and to such an extent as to permit the immediate seeding thereof without the use of harrows, cultivators, rollers, and like devices, and it has for its objects, first, to devise a plow of this nature which will turn the soil upside down so that the vegetable matter, manure, or other enriching substances located on the surface thereof will be transferred beneath the turned soil and thereby obtain the best enriching effects from such substances. Second, to provide a plow of this nature which will be adapted to first divide or sever the soil into a series of strips through the agency of cutters or blades, and afterwards through the agency of rotary spades or shovels and ejecting means completely turn all of the strips thus cut upside down, thereby enabling one to prepare the soil for immediate seeding with great speed and effectiveness. Third, to provide a plow of this nature which shall be adjustable to such an extent as to enable the user to regulate the depth at which the soil may be prepared for seeding. Fourth, to provide a plow of this nature which may be either drawn by animals, or any extraneous source of power as a steam or explosive engine; or which may, if desired, be propelled by a source of power carried by the wheels which support and guide the plow itself.

For a full and clear understanding of my invention such as will enable others skilled in the art to construct and use the same, reference is had to the accompanying drawings, in which, Figure 1 is a side elevational view of my improved plow as seen in operation moving from left to right in the direction of the arrow, parts of the apparatus being shown in sectional view. Fig. 2 is a plan view thereof as seen looking at Fig. 1 from the top toward the bottom of the drawings, the upper spade or shovel, however, being removed in this view for the purpose of better illustrating the complete structure of the adjoining parts. Fig. 3 is a sectional view taken through half of the drum or cylinder which supports or carries the strip cutters or blades. Fig. 4 is an enlarged perspective view of that part of the plow proper which effects the removal of the soil from the rotary spades or shovels and the pulverizing thereof as it is turned over and thus prepared for seeding purposes. Fig. 5 is a perspective view of the rotary spades or shovels and driving sprocket wheels, the ejecting means, however, not being shown in this view.

Referring now to the drawings in detail 1 represents a strong rectangular shaped frame provided at its four corners with upright standards or posts 2, 2, 2, 2, and 3 represents an iron rod extending entirely around the frame and attached at its opposite ends to the four standards, and at its center on both sides to the body of the frame under inwardly projecting extensions of the journal bearings of a part of the driving gear of the spades or shovels to be hereinafter described, the function of said rod being to give great strength to the structure.

4 is a hollow drum having two concentric cylindrical walls 16 and 17 (see Figs. 1 and 3) 19 and 20 being rectangular shaped openings located in alinement with each other through said walls for the purpose of receiving the wedge-shaped extensions or arms of cutters or blades 18, 18 (see Fig. 1) there being as shown in the drawings and particularly in Figs. 2 and 3, six complete series of such cutters or blades which are detachably secured in place between the two concentric walls by a series of bolts 21 which perform the double function of holding them and also holding the drum 4 in rigid relation with the main driving sprocket wheels 5, 5, of cast metal to which the drum is secured, said sprocket wheels being journaled in journal bearings on the inside of the frame 1 and the entire arrangement such that any cutter or blade may be withdrawn for repairs or a new one substituted therefor at will, most of these blades being removed in the plan view, Fig. 1.

6, 6, are sprocket-wheels upon a second shaft supported in journal bearings carried by the frame and about the center thereof, said sprocket-wheels being interconnected with the sprocket wheels 5, 5, by sprocket chains 7, 7.

8, 8, are additional sprocket-wheels on the same shaft with the sprocket wheels 6, 6, of greater diameters, and 9, 9 are smaller sprocket wheels upon two rotary hubs 13, 13 adapted to rotate upon a stationary shaft 14 supported also by the frame, 10, 10 being sprocket chains for connecting the sprocket wheels 9, 9 with the sprocket wheels 8, 8.

11, 11 are downward angular extensions beneath the frame provided with oblong slots as shown and adapted to support four spindles 12, 12, 12, 12 through the agency of adjustable bolts, said spindles constituting a means of support for traction wheels, not shown, but which are adapted to carry or convey the machine to the point where it is to be used, or which, when the machine is driven by a source of power thereon will constitute the traction or driving wheels proper, the vertical adjustability of these traction or driving wheels through the agency of the bolts and slots shown making it possible to vary the depth of soil which it is desired to cultivate.

15, 15 are rotary spades or shovels secured at their opposite sides by arms directly to the hubs 13, 13 and adapted to rotate therewith in the direction of the arrows, Fig. 1, there being shown three such shovels.

It is to be noted that the relation of the gearing of the several sprocket wheels and sprocket chains is preferably such the speed of rotation of the spades or shovels would be about six times that of the rotation of the drum 4, and also that by reason of the intermediate sprocket wheels 6, 6, there is given to the rotary shovels a rotation in the direction of rotation of the traction or driving wheels of the drum 4, and this feature of rotation of the shovels in the direction indicated constitutes an important point of novelty of my invention, as will be described later on in connection with the description of the mode of operation.

24, 24 are the cutting edges of the shovels which are of good steel and detachably secured thereto (see Fig. 5) and it will be apparent, on inspection of the drawings, that the distance from the center of the stationary shaft 14 on which the shovels are journaled to said edges is considerably greater than the distance from the same point to the rear edges 22, 22 of said shovels, and this feature is made the more apparent by virtue of the dotted circle which passes through all of the edges 24, 24. The function of this difference in radial lines of the front and back edges of the shovels will be described also in connection with the description of the mode of operation.

23, 23 are triangular shaped extensions at the rear sides of the shovels for causing the same to hold the soil therein until it has been turned completely over and is ready for discharge therefrom.

25 is an arm rigidly secured to the center of the stationary shaft 14 and provided with a head 26; 27, 27 being arms extending therefrom and to which are pivotally supported sharp edged scrapers 28, 28 through the agency of short arms 29, 29 (see Fig. 4) 30, 30 being stationary shoulders on the arms 27, 27 and 31, 31 movable shoulders integral with the arms 29, 29, said combined shoulders limiting the outward pivotal movement of the scrapers.

33 is a curvilinear metallic apron secured directly to the pivoted arms 29, 29 and moving therewith and hence with the scrapers 28, 28, and 32 is a strong curvilinear spring secured at one end directly to the under surface of the arm 25, the free end thereof having sliding bearing against the inner surface of the curvilinear metallic apron 33, these parts constituting together means for ejecting and pulverizing the soil as it leaves the shovels, so that harrowing or cultivating with additional appliances will not be necessitated.

34 is a series of heavy iron rollers journaled beneath the rear end of the frame in vertical standards 35, 35 having sliding movement in the standards 2, 2 of the frame.

36, 36 are racks on the front faces of the standards and 37, 37 are pinions supported at the outer ends of a rotary shaft 38 journaled in the frame, said pinions being adapted to mesh with the racks and to move the same vertically through the agency of a detachable operating handle 39. This handle may be locked by any preferred means so as to prevent movement of the rack when adjusted to the proper height.

41 is a curved guard or apron for preventing the soil from being thrown from the shovels and upon the rollers 34, and also for aiding in more effectually pulverizing the soil as it is snapped or thrown from the shovels, and 42 is a scraper blade yieldingly pivoted to the standards 35 for the purpose of scraping any dirt off the rollers 34, 34 which may accumulate thereon.

43 are holes in the front standards 2, 2, for receiving a draw bar 44 to which is secured a clevis 45 or other draft attachment.

I will now describe the mode of operation:—As shown in Fig. 1 of the drawings my improved plow is illustrated as in operation, the same acting through the agency of its own weight for forcing the cutters or blades 18, 18 into the soil to the full length of said blades, the drum 4 in this instance determining this depth and upon the supposition that the device is being drawn by an extraneous source of power, as animal power or the like attached to the clevis 45. As thus drawn the blades 18, 18 cut or slice the soil into five strips of equal width and inasmuch as the ratio of the gearing between the sprocket wheels 5, 5, 6, 6, 8, 8, and 9, 9 and the interconnected sprocket chains is preferably such as to give to the shovels a speed of rotation approximately six times that of the drum 4, said shovels are, therefore, caused to cut the strips into relatively thin slices and as they advance in their course of rotation the upper surface of the soil, and the grass, manure, or other substance thereon, is brought into frictional contact with the triangular shaped holding extensions 23, 23 and thus carried forward until the soil is turned completely upside down; that is to say, in the position shown at the extreme left in Fig. 1. At this point the sharp edged scrapers 28, 28 which are so constructed that their lateral edges pass between the lateral edges of the triangular shaped extensions enter the shovel and by reason of the action of the spring 32 are caused to bear firmly against the inner curvilinear face of that particular shovel, and as the same is advanced the spring is put under strong tension by reason of the difference in radia of the front and back edges of the shovel, as before described, so that finally when the soil is pushed out at the bottom, the scrapers 28 are suddenly snapped backward and with them the curved apron 33, thus giving to the soil a sudden shock which pulverizes it and leaves it in the condition shown at the extreme left with the grass, manure or other substance underneath. As the machine advances the heavy rollers 34, 34 roll it down level and leave it in this pulverized and rolled condition ready for seeding processes, and as described at one operation. If it be desired to thus completely turn a lesser depth of soil than that indicated in the drawings it only becomes necessary to raise the rear end of the machine by the adjustable racks 36, 36, pinions 37 and operating handle 39, such adjustment being completely at the will of the operator. If it be desired to merely turn and cut a relatively thin surface of the soil with the expenditure of relatively less energy, it only becomes necessary to apply the two front traction wheels and make such adjustment for cutting it as may be required through the agency of the bolts, slots and spindles, as shown in Figs. 1 and 2.

Obviously the means of propelling the entire apparatus through the agency of a portable source of power carried thereby may be applied in a manner readily appreciable to those skilled in the art of applying power mechanisms in connection with the utilization of energy.

I do not limit my invention to the especial details of construction shown in the accompanying drawings, as a number of the features thereof may be departed from and still come within the scope of my claims hereinafter made. I believe it is broadly new with me to provide a rotary plow which cuts and turns the soil upside down in its mode of operation and at the same time pulverizes it and prepares it for seeding at one operation, and my claims are generic as to these features.

Having thus described my invention what I claim and desire to secure by Letters Patent of the United States is—

1. Means for dividing the soil into a series of parallel strips embracing a series of cutters or blades and two concentric drums provided with openings therethrough; in combination with bolts extending through the inner ends of the cutters and the ends of the drums, the structural arrangement being such that the bolts and concentric drums hold the cutters rigidly in place, substantially as described.

2. Means for preparing soil for seeding at one operation, embracing a series of cutters and a series of rotary spades, all supported by a common frame and intergeared in such relation that the spades follow the cutters as the machine advances; in combination with means for successively ejecting the soil from the spades and pulverizing it; together with means following the spades for rolling or leveling the pulverized soil, substantially as described.

3. A plow embracing a series of rotary cutters adapted to slice the soil successively as it advances; in combination with rotary spades and a single ejecting device adapted to eject the soil successively from each of said spades as they are rotated, substantially as described.

4. Means for preparing soil for seeding at one operation, embracing a supporting frame; a series of rotary cutters; a series of rotary spades adapted to follow said cutters; a single ejecting device adapted to eject the soil from each of the spades successively as they rotate, and additional means for rolling or leveling the same after it is thus ejected, substantially as described.

5. Means for preparing soil for seeding at one operation, embracing a supporting frame, a rotary drum carrying a series of sets of cutters or blades; a series of rotary spades journaled behind the cutters and geared thereto through speed gear; a single ejecting device adapted to eject the soil and pulverizing it as each spade is rotated past said ejector, and additional means for rolling or leveling it, substantially as described.

In testimony whereof I have signed my name to this specification in the presence of two subscribing witnesses.

NICOLA GIUSTO.

Witnesses:
LAWRENCE ZAMBONI,
GENNARO C. CORSI.